2 Sheets—Sheet 1.

G. CHILSON.

Heat Generator and Radiator.

No. 1,782. Reissued Sept. 27, 1864.

Witnesses
Frederick Curtis
J. W. Hale Jr

Inventor
Gardner Chilson
by his attorney
R. H. Eddy

N. PETERS, Photo-Lithographer, Washington D. C.

G. CHILSON.

2 Sheets—Sheet 2.

Heat Generator and Radiator.

No. 1,782.

Reissued Sept. 27, 1864.

Witnesses
Frederick A. Cutter
J. Pohle Jr

Inventor
Gardner Chilson
by his attorney
R. H. Eddy

N. PETERS, Photo-Lithographer, Washington, D. C.

BEST AVAILABLE COPY

UNITED STATES PATENT OFFICE.

GARDNER CHILSON, OF BOSTON, MASSACHUSETTS.

IMPROVEMENT IN FURNACES OR HEAT GENERATORS AND RADIATORS.

Specification forming part of Letters Patent No. 11,718, dated September 26, 1854; Reissue No. 1,782, dated September 27, 1864.

*To all whom it may concern:*

Be it known that I, GARDNER CHILSON, of Boston, in the county of Suffolk and State of Massachusetts, have invented a new or Improved Furnace or Heat Generator and Radiator, to be used for warming buildings or apartments, or for other useful purposes; and I do hereby declare the same to be fully described in the following specification and represented in the accompanying drawings, of which—

Figure 1:
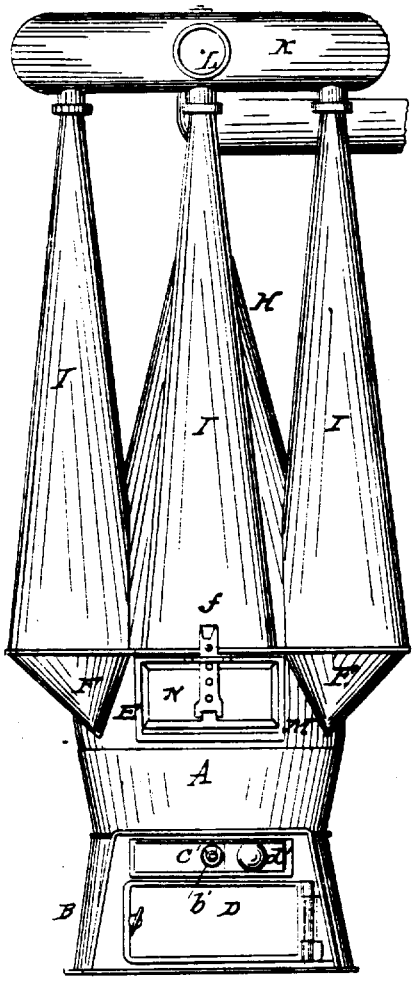
Figure 2:
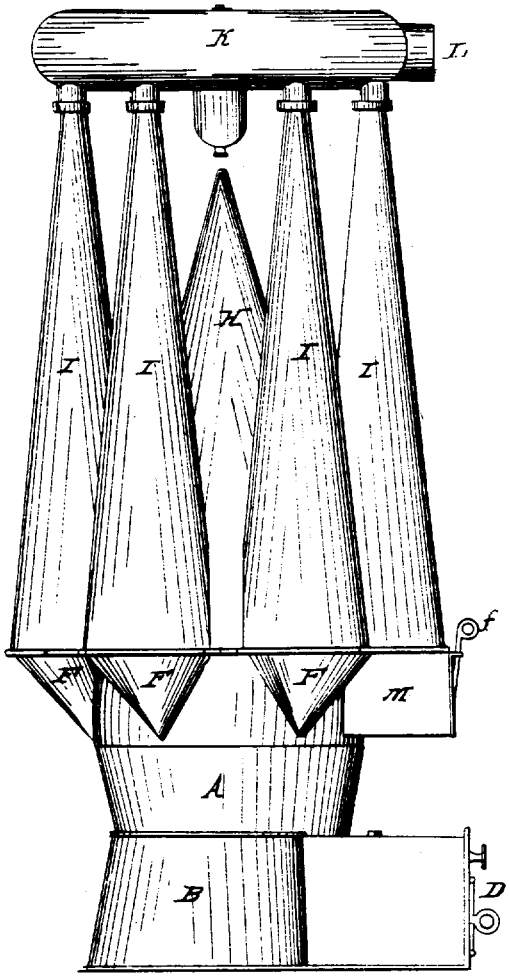
Figure 3:
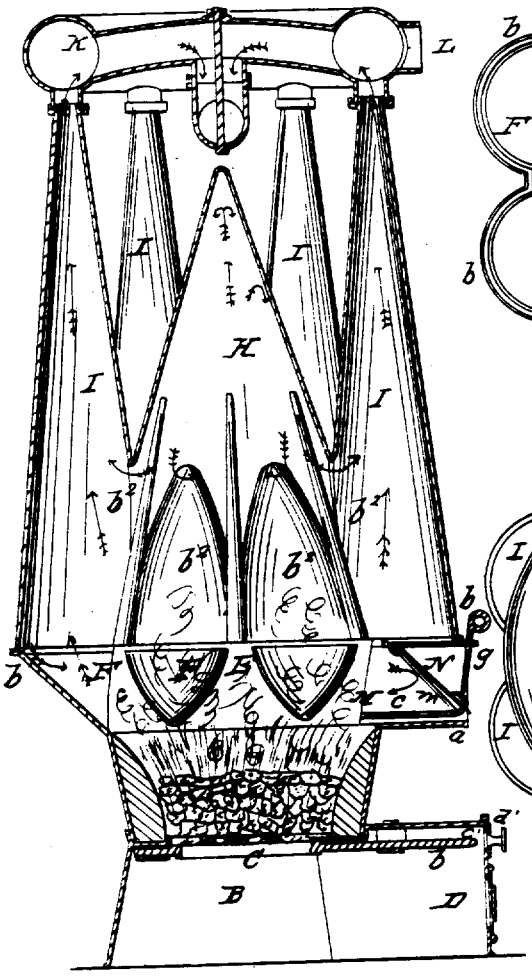
Figure 5:
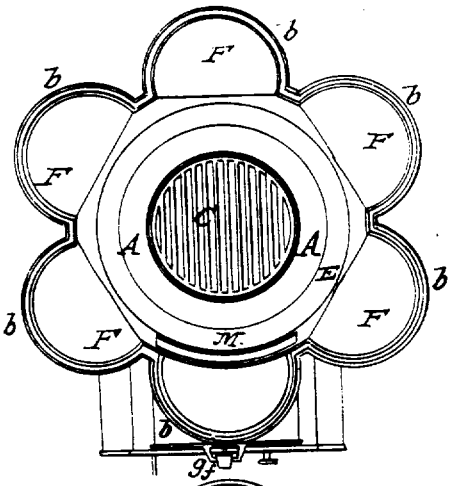
Figure 4:
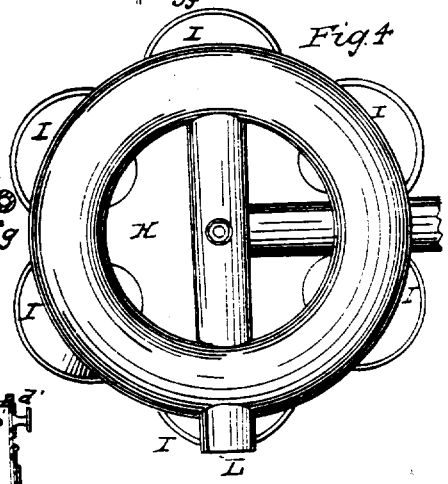

Figure 1 represents a front elevation of my heat generating and radiating apparatus or furnace. Fig. 2 is a side elevation of it. Fig. 3 is a vertical, central, and longitudinal section of it. Fig. 4 is a top view of it. Fig. 5 is a top view of the fire-chamber of it as such chamber appears when its pyramidal or frustoconic heat radiators or chambers are removed from it.

In the said drawings, A denotes the fire pot or place for reception of the fuel. It is made, generally speaking, of a depth equal to about one-fourth of its breadth at top and gradually diminishing in width to its bottom, so as to give to it the appearance of a broad flaring pan or vessel. This pan or fire-pot may be constructed of cast-iron or other proper material, and if necessary it may be thoroughly protected on its inner surface by a lining of soapstone, fire-brick, or other suitable substance arranged on it, where the fuel would be likely to lay in contact with it, such lining not only serving to prevent the shell of the fire-pot from becoming overheated, but also that injury that would result thereby to air coming in contact with its exterior surface. It also prevents the fire-pot from being destroyed by the action of the fire. By employing a broad and shallow fire-pot a great economy of fuel results, as unnecessary waste of fuel is avoided on account of the slowness of its combustion, it being well known that when fuel is burned in deep and narrow iron vessels the combustion of it is faster than it is in those which are broad and shallow, while as a general thing the advantageous exposure of the radiating-surface of the fuel is not so great in the latter as in the former. This fire-pot A rests on an iron base or ash-box, B, made of sufficient depth for the reception of the ashes as they may be formed, and also to admit of the revolution of a revolvable grate, C, placed at the bottom of the fire-pot, as seen in the drawings. At the front of the ash-box or base is a door-opening closed by a door, D, such being for the purpose not only of regulating the draft or supply of air under the grate, but for allowing (as circumstances may require) the removal of the ashes, &c., from the ash pit or box. Above the door D, and directly in line of the shaft $b'$ of the grate, is a register-opening, $c'$, which has a closing-slide, $d$, applied to it. This arrangement of the register-opening, with respect to the shaft of the grate, not only enables the said shaft not only to be disposed entirely within the ash-pit entrance, but also enables the register-opening to answer the purpose of not only admitting air to the fuel or fire when required, but also of allowing a key or crank to be introduced through it and fitted on the shaft for the object of turning or moving the grate when necessary to do so, and this without danger of ashes escaping out of the ash-pit. provided its door be closed. On the top of the fire-pot rests a large rim or flange, E, constructed about the height of the fire-pot and made with a series of hollow inverted semi-cones, as seen at F F F, &c., these semi-cones being made to extend beyond the flare of the flange and to form so many heat absorbing and radiating swells or extensions of the rim, while their several bases are arranged in a horizontal plane. Along the periphery or upper side of the rim E and the bases of the semi-cones there should be groove $b$ $b$, for the reception of the radiator or radiator-cones, to be hereinafter described, and for the purpose of fixing the same thereto with a close joint by means of sand, cement, or bolts, as the case may require. In the before-mentioned groove rests a central cone-frustum or pyramid, H, and a series of any suitable number of attached hollow pyramids, frusta, or cones, I I I, &c., (the drawings representing six of them,) they being arranged around and adjoining the central cone. These external cones, together with the central cone, not only are united for some distance above their bases, so as not only to all open into the fire-chamber over the fire-pot, but so that each external cone shall enter into the main or internal cone by a passage or archway, as seen at $b^2$. Above the joinings of the surrounding cones and the central cone each of the former cones becomes distinct from the central cone, and constitutes a smoke-passage, which leads up into a hollow annulus or ring, *k*, or common smoke-chamber or radiator suitably formed. The external cones are made to open into this chamber by apertures in each, whose united capacities or areas should be equal or about equal to that of the cross section of the interior of a discharging smoke-pipe made to lead out of the chamber or annulus. The ring may be provided with one or more cleansing-openings, L, which may be entirely covered when the apparatus is in use.

Attached to and extending from the broad flange E, that rests on the top of the fire-pot, is a rectangular throat or mouth piece, M, which is made to open into the fire-place, and for the purpose of enabling it to be supplied with fuel, this mouth-piece or flange is provided with an inclined door, N, which is hinged at the top of the mouth-piece and projects forward at an angle of about forty-five degrees with the horizontal bottom of the mouth upon which it rests, the same being arranged as shown in the drawings. When the door is closed, it is supported on the bottom of the mouth-piece at or near its front edge. The said door is provided with a projecting ledge or flange, *a'*, which, when the door is closed, rests on the bottom of the mouth-piece, and passes down by and close against a horizontal plate, *c*, which is placed a very short distance above the bottom of the mouth-piece and parallel to said bottom, the open space between said plate and the bottom of the mouth-piece serving to admit air in a thin sheet or current to the fire and over the fuel. This thin sheet of air in passing under the plate *c* (which it will when the door is elevated a short distance) becomes highly heated by contact with it, such plate being caused to receive heat, which is reflected upon it by the fire-place door. In this way the stratum of air becomes highly heated before and when it reaches the gases or fuel, the heat received by it serving to greatly facilitate the combustion of the volatile gaseous products arising from the fuel. The ledge *a'* should be formed so as to work close against the front edge of the plate *c* until it (the ledge) is elevated entirely above the top surface of the plate. By means of the ledge the amount of air passing under the plate can be regulated.

Each of the vertical sides of the mouth-piece may be provided on its inner surface with an inclined projecting flange or ledge, *m*, for the door to close against. Attached to the door or hinged to the front edge of it is a flat handle, *f*, such handle having several holes, notches, or equivalents in it, so as to enable the door to be elevated and supported by a stud, *g*, (or its equivalent,) extending from the top of the mouth-piece and introduced into any one of the holes or notches when the door is raised upward.

By this arrangement of the door sundry important advantages in the operation of a furnace, stove, &c., are attained. There results from it the prevention of the escape of gas or smoke out of the mouth-piece while the fire-pot is being supplied with fuel or the door is being opened for the purpose of enabling a person to examine the fire. Another advantage consists in the facility which this arrangement offers to regulation of the draft or admission of air into the mouth-piece, for the combustion of the gases arising from the fuel at the door can be adjusted at any desirable elevation such as may be necessary to supply the required amount of air for the combustion of the gaseous products.

By this arrangement the air admitted is caused to pass in direct contact with or immediately over the upper portion of the fuel in the fire-pot. Another advantage is that when the door is nearly closed it permits but a thin stratum of air of the width of the doorway to pass under it, which, owing to the inclination of the door, has rays of light and heat from the fire-pot reflected by the door down directly upon it, whereby the said current of air becomes charged with heat before it comes in contact with the gaseous or volatile products of combustion arising from the fuel, the same causing such gaseous or volatile products of combustion to more readily ignite and consume the carbon of the smoke than they would provided they received in the ordinary way of admitting air into and through the doorway a current of cold instead of a current of heated air.

A great economy in the consumption of fuel I have found to result from the employment of a reflecting-door arranged and made to operate in the above-described manner within a mouth-piece. The sides of the mouth-piece prevent lateral disturbing currents of air from rushing up the main current that passes under the doorway. In ordinary hot-air furnaces, stoves, &c., there is, generally speaking, from the fuel a very large percentage of the volatile combustible products that passes off into the chimney in a crude or unburned state and is totally lost.

It will appear obvious to any scientific mind that with the common fire-door arranged to swing on the outside of the mouth-piece of a furnace or a stove there must of necessity be lateral currents of cold air admitted into the door-opening when the door is opened. These unsteady currents often cause the smoke and more or less of the volatile products of combustion to rush out of the upper part of the doorway and into the room or apartment in which the furnace or stove may be.

By my improved mode of arranging and applying a door there is little or no possibility of such escape of smoke and gases, for the inner surface of the door against which they may be thrown being made to incline inward as it rises, they are caused to pass upward, and thus prevented from escaping out of the doorway. Another important advantage gained consists in having the door entirely out of the way, or protected within the mouth-piece, it not swinging outward into the room as does a common door, as it is generally applied to the mouth of a furnace. As one of the conic frusta or cones is located directly over the door, as seen in the drawings, there is no convenient place in the doorway for the smoke and gases to collect and eddy about, as they often do in the common box-throat or mouth-piece provided with a perpendicular door applied at its outer end. The smoke from the fire-pot can pass freely up into said cone, where it is retained until much, if not all, of its combustible contents are consumed and the heat thereof received by absorption and radiation.

By my arrangement of conical or diminishing flues, the volatile products of combustion are spread from the top of the flare of the fire-pot into and against the trunks of the surrounding cones, the large central cone receiving a great amount, if not nearly all, the smoke and volatile products of combustion and holding them, more or less, suspended over the fire, so as to enable them to be thoroughly burned. The incombustible portions of them, together with such portions of them as may be combustible and have not been consumed, flow out of the main cone and into the trunks or mouth of the surrounding cones, and thence, after imparting heat to such cones, pass into the annular chamber or annulus above the cone, and traversing throughout the same escape through its exhaust-pipe, the combustible properties of the fuel in the meantime being very thorougly consumed.

By my heat-generator the volatile products of combustion, as they rise upward into the cones, are compressed or wedged together by the continued taper of the cones, and are subjected by the same to the action of the rays of light and heat from the fire-pot until their combustible properties are thoroughly consumed and their heat exhausted by absorption and radiation, as hereinbefore described.

The action of the cones in absorbing their heat is entirely different from that of a common cylindrical pipe or flue having vertical sides, for in such a pipe or flue, in consequence of its sides being vertical, the smoke and ascending gases impinge to a very small extent against the inner surfaces, and therefore there can be but little of the contact, retention, and contraction of them which take place in the tapering flue, such contact, retention, and contraction of the volatile products serving to increase the absorption of heat from them as well as to facilitate the combustion.

From the above it will be seen that under my arrangement of the cones over the fire-pot I am enabled not only to abstract all or nearly all the heat from the fuel and its volatile products of combustion, but to accomplish this without descending pipes, flues, or radiation outside of the furnace and in the air-chamber usually surrounding it and exposed to direct contact with the cold air, the employment of such descending pipes or flues tending greatly to diminish the draft.

As the heat on leaving the fire-pot is nearly equably spread over all the internal absorbing surface of the cones, there is insured a great equality of heat radiated, a mild, agreeable, and soft warmth of the surronding without danger of its being overheated. The peculiar arrangement of the cones enables the external air to circulate freely between them without injurious obstruction. By my arrangement of heating-surfaces it will be seen that owing to their not being liable to be ever overheated my heat generating and radiating apparatus must be a very durable one, and also that I secure an immense radiating and heating surface of great power and quick action, which any scientific mind cannot fail to see at a glace. Notwithstanding there is this large heating-surface over the fire, it is so broken up in the formation of the conical surfaces as to prevent to a great extent, if not entirely, the production of the internal, inert, sluggish, or inactive heat which is generally caused in large cylindrical bodies or radiating drums when the heat cannot all be made to act at once on their internal surface, the same causing a great waste of heat.

By my conical heat generator and radiator not only is there an active heating-surface, but as the radiating-cones are at once filled with the heated smoke and gases, and operate to retain them over the fire and to present them to the direct action of the light and heat from it, or the fuel in combustion, the combustible property of the smoke and gaseous products are very thoroughly, if not entirely, burned out of them. It will readily be seen why this is accomplished—first, because of the united surrounding tapering cones, (the areas of whose openings into the annular chamber or general heat-receiver when taken together are about equal to the area of cross-section of the smoke-pipe,) the heated smoke and gases can escape but slowly, and consequently they become very highly heated, and so as not only to have their combustible properties consumed, but they (the said smoke and gases) are retained in the cones sufficiently long to cause them to perform the part of ignited fuel—viz., that of generating heat for radiation, and enabling the cones to absorb and radiate such heat with great activity.

Another great result is here developed—viz., that as these cones become filled with light and heat such will be reflected down upon the fuel and upon the inner surface of the surrounding inverted semi-cones. The effect of this is of the utmost importance, as it not only keeps the top of the fire bright, or aids in the combustion thereof by consuming the gases, but it engenders a powerful heat, which is absorbed by the inverted semi-cones, and externally radiated and dispersed downward around the entire heating apparatus, so that when such apparatus is used with the hot-air chamber of a furnace or of a stove for heating purposes the floor on which it is supported is made comfortably warm all around the stove within a circumscribing circle of several feet radius, thus securing the great and important object of warming the floor and lower currents of air in the room, or the air chamber of the furnace, as the case may be.

The series of inverted and semi-cones and the series of upright tapering radiators cooperate together so as to produce within themselves reflection and counter-reflection of heat and light, and thereby greatly aid in the consumption of the gaseous products of combustion and the absorption and dissemination or radiation of their heat. This apparatus has a beautiful effect when used as a furnace for heating air for distribution, for so great a degree of heat is thrown off at the bases of the inverted semi-cones it is met and absorbed by the cold air on its entrance into the air-chamber of the furnace, and consequently the air becomes very thoroughly charged with heat before it is discharged into the apartments to be warmed, receiving heat to a greater extent at the bottom of the air-chamber than is the case in furnaces having no such downward radiation of heat acting in conjunction with the fire-pot.

Another important advantage secured by my invention, and which has been found to result in practice, is that with it it becomes nearly if not quite impossible to form clinkers in the coal, as the coal is consumed so slowly and steadily that it is reduced to ashes by a natural process of combustion, as it were, which is not favorable to the reduction of any part of it to clinkers, as there is no one large escape-pipe to produce rapid combustion by concentration of the draft through the fuel, but there is a series of small escape-tubes of a capacity less than the final discharge. These by their action tend to prevent the formation of clinker, vitrification and clinker being generally formed by a rapid combustion of the coal induced by any cause, and particularly when there is a large straight outlet to the furnace for the smoke to rush rapidly out of or be discharged and create a strong draft up through the coal. Such a process I have found, invariably soon exhausts from the fuel those parts of it most combustible and reduces the coal to slag and clinker. In this case the fire must soon be replenished, or it will go out; but my invention affords almost, if not entirely, a perfect remedy for all the evils in the common mode of burning coal.

In my apparatus there is another important advantage secured by this invention—viz., that of spreading the flame and drawing it off into the surrounding cones, so as to prevent any one place or part of the radiator from becoming overheated, all parts of it being very equally heated. My improved heat generating and radiating apparatus is not only adapted to the use of anthracite or other coal as fuel, but owing, generally speaking, to the great breadth of the fuel-chamber, wood may be burned in it to good advantage.

Another advantage is gained by my heat generator and radiator, that with it there is little or no possibility of the inner surfaces of the tapering frusta or cones becoming injuriously coated or clogged with soot, this being owing to the inclination of such surfaces over the fire. The impingement of the rays of light and heat against them, and the action of the same therein, is such as to prevent the accumulation of soot or deposits of the kind set forth.

I am aware that a tapering flue having bends or branches connected by flexures, bends, or elbows has been constructed and arranged so that its mouth or entrance shall be directly over a fire pot or chamber, while its eduction-opening into the discharge-flue has been made just or about of sufficient size to freely carry off the non-combustible volatile product and to cause the retention in the tube of the combustible products arising from the fuel in the fire pot or chamber. Such a tapering flue or tube so applied will be found described in the specification of a patent granted to me in the United States of America on the 16th day of September, A. D. 1851.

The said bent tapering tube differs not only considerably in construction, but considerably in its operation, from a tapering tube made without branches, bends, or flexures, arranged directly over the fuel and provided with an eduction-opening just or about sufficient to permit to pass off through it the non-combustible portions of the volatile products of combustion, while it retains in the tube the combustible portions of such products. The difference is that in the latter tube all the combustible gases and portions of the smoke are held suspended directly over the fire and are not removed into one or more descending flues or parts of the bent tapering tube, where, from their remoteness to the fire, they are not only less liable to be consumed, but do not have their non absorbed light and heat reflected directly downward upon the fuel. In the employment of the tapering tube without bend or flexure my purpose has been to avoid any of the injurious effects of a bend or flexure that, carrying the smoke from directly over the fire, creates a downward draft of it in its course toward the eduction-opening. It will readily be seen that such a descending portion of a flue, when leading into an ascending portion of the flues, operates to prevent the volatile products in the said ascending portion from returning back upon the fire. Experience has demonstrated that although one long bent tube is an excellent radiator of heat, yet it is not so valuable as a single unbent tube or a series of such, arranged so as not only to retain the volatile products directly over the fire, and in close proximity with it, but so that their unobsorbed light and heat may be directly reflected or thrown down upon the fuel while the non-combustible portions of the volatile products are allowed to escape at the smaller ends of the tubes. Another advantage results from the employment of an unbent tapering tube of the kind above mentioned. External radiation of heat from it is not obstructed, as it is in a tapering tube having one or more descending branches or parts, wherein by contiguity of the ascending and descending portions more or less obstruction to a free radiation and escape of heat results. In the bent tapering radiator there is not that uniformity of heat in the surface that there is in the unbent tapering tube, as the upper portions or bends of the tube become more heated than the lower portions, and are constantly liable to be overheated.

What, therefore, I claim as of my invention is as follows, viz.:

1. In combination with one or more tapering tubes, substantially as described, made to communicate in the fire-chamber, essentially as specified, a conical or tapering radiator closed at top and arranged directly over the fire, and made to open near its base in the said tapering tube or tubes, and to operate with respect to them and the fire pot or chamber and the surrounding air or medium to be warmed or heated, substantially as specified.

2. Arranging the feed or fire-place door within the trunk or mouth-piece to the fire pot or place, and so as to operate as specified.

3. In combination with the mouth piece and the door arranged in it, as specified, the passage in the mouth piece and its plate *c*, for the thin sheet or stratum of air to pass under the door (while it is wholly closed) and said plate *c*, and be heated by contact with the plate before it (the said air) reaches the fuel.

4. In combination with the inclined door of the fire-place, the plate *c* and the air-passage directly under it, the ledge or flange *a'*, arranged as described, the same being not only for the purpose of regulating the admission of air into the passage, but of keeping it from passing under the door and over the plate *c* while the ledge is below the level of the top surface of the plate.

5. The arrangement of the register-hole, (viz., in line of or axially with respect to the shaft of the grate,) in combination with the arrangement of the outer end of said shaft—viz., entirely within the throat of the ash-pit, or in rear of the registry plate or opening, as specified, the said arrangement not only enabling me dispose the grate-shaft entirely within the ash-pit mouth, (the end of said shaft when projecting from the front face of the furnace being, generally speaking, more or less in the way, besides presenting an appearance often disagreeable to the eye,) but to make the registry-opening answer the purpose not only of admitting air to the fire, when required, but of enabling a person to place a key or crank upon the shaft for the purpose of turning or moving the grate when necessary, and this without danger of ashes escaping out of the ash-pit, provided its door be closed.

6. The combination of a fire-pot, a dome surmounting it, and a series of flues leading from the base or lower part of the dome, the whole being substantially as hereinbefore described.

7. The combination of a fire-pot, a dome surmounting it, a series of flues, (leading from the base or lower part of the dome,) and a series of conical or partially conical bases or semi-cones, serving not only to facilitate the entrance of smoke and heat into the conical radiators or flues, but the absorption of heat and its radiation toward the floor and its reflection into the tapering radiators, the whole being substantially as specified.

8. The combination of a fire-pot, *a*, dome surmounting it or placed over it, a series of flues, (leading from the base or lower part of the dome,) and a hollow ring or annular radiator placed on and opening out of the said flues, the whole being substantially as hereinbefore explained.

GARDNER CHILSON.

Witnesses:
R. H. EDDY,
F. P. HALE, Jr.